United States Patent [19]

Lee, Jr.

[11] Patent Number: 4,525,508
[45] Date of Patent: Jun. 25, 1985

[54] PLASTICIZED REINFORCED COMPOSITIONS OF A POLYPHENYLENE ETHER RESIN

[75] Inventor: Gim F. Lee, Jr., Albany, N.Y.

[73] Assignee: General Electric Company, Pittsfield, Mass.

[21] Appl. No.: 494,031

[22] Filed: May 12, 1983

Related U.S. Application Data

[63] Continuation of Ser. No. 334,636, Dec. 28, 1981, abandoned, which is a continuation of Ser. No. 755,025, Dec. 28, 1976, abandoned.

[51] Int. Cl.$^3$ .......................... C08K 3/10; C08K 5/52; C08K 3/26; C08L 71/04
[52] U.S. Cl. .................................... 524/140; 524/141; 524/142; 524/143; 524/144; 524/409; 524/413; 524/420; 524/423; 524/425; 524/426; 524/430; 524/432; 524/436; 524/444; 524/445; 524/451; 524/504; 524/505; 524/508
[58] Field of Search ............... 524/444, 508, 425, 426, 524/430, 436, 504, 445, 451, 413, 423, 420, 409, 505, 432, 140, 141, 142, 143, 144

[56] References Cited

U.S. PATENT DOCUMENTS

| | | | |
|---|---|---|---|
| 2,857,360 | 10/1958 | Feuer | 523/100 |
| 2,943,074 | 6/1960 | Feuer | 525/227 |
| 3,231,635 | 1/1966 | Holden et al. | 525/271 |
| 3,251,905 | 5/1966 | Zelinski | 525/272 |
| 3,257,357 | 6/1966 | Stamatoff | 528/215 |
| 3,257,358 | 6/1966 | Stamatoff | 528/212 |
| 3,281,383 | 10/1966 | Zelinski et al. | 525/122 |
| 3,306,874 | 2/1967 | Hay | 528/215 |
| 3,306,875 | 2/1967 | Hay | 525/215 |
| 3,383,435 | 5/1968 | Cizek | 523/132 |
| 3,431,323 | 3/1969 | Jones | 528/258 |
| 3,794,606 | 2/1974 | Bennett et al. | 524/504 |
| 3,887,646 | 6/1975 | Yonemitsu et al. | 524/508 |
| 3,887,647 | 6/1975 | Yonemitsu et al. | 524/504 |
| 3,952,072 | 4/1976 | Yonemitsu et al. | 524/504 |
| 4,131,598 | 12/1978 | Abolins et al. | 525/133 |
| 4,167,507 | 9/1979 | Haaf | 524/505 |
| 4,317,761 | 3/1982 | Abolins | 524/141 |
| 4,318,836 | 3/1982 | Abolins | 524/141 |
| 4,332,714 | 6/1982 | Haaf et al. | 524/141 |
| 4,373,052 | 2/1983 | Abolins et al. | 524/451 |
| 4,373,064 | 2/1983 | Bennett et al. | 525/68 |

*Primary Examiner*—Herbert J. Lilling
*Attorney, Agent, or Firm*—Hedman, Gibson, Costigan & Hoare

[57] ABSTRACT

There are provided plasticized thermoplastic compositions useful for molding which comprise a polyphenylene ether resin, a plasticizer, a mineral reinforcing agent, e.g., aluminum silicate, titanium dioxide, zinc oxide, antimony oxide, and the like, and optionally, an impact modifier. The compositions possess improved stiffness properties with unexpectedly significant retention of ductility in comparison with corresponding compositions which do not contain the mineral reinforcing agent.

33 Claims, No Drawings

PLASTICIZED REINFORCED COMPOSITIONS OF A POLYPHENYLENE ETHER RESIN

This is a continuation of application Ser. No. 334,636 filed Dec. 28, 1981, now abandoned, which, in turn, is a continuation of Ser. No. 755,025, filed Dec. 28, 1976, now abandoned.

This invention relates to mineral reinforced, plasticized polyphenylene ether compositions. More particularly, it relates to thermoplastic molding compositions comprising a polyphenylene ether resin with or without an impact modifier, a plasticizing amount of a plasticizer, and a mineral reinforcing agent which provides improved stiffness with unexpectedly significant retention of ductility.

BACKGROUND OF THE ART

The polyphenylene ether resins are well known in the art as a class of thermoplastics which possess a number of outstanding physical properties. They can be prepared, in general, by oxidative and non-oxidative methods, such as are disclosed, for example, in Hay, U.S. Pat. Nos. 3,306,874 and 3,306,875 and Stamatoff, U.S. Pat. Nos. 3,257,357 and 3,257,358, which are incorporated herein by reference.

It is known that the polyphenylene ether resins can be combined with impact modifiers to obtain improved impact resistance and other mechanical properties. Suitable impact modifiers for polyphenylene ether resins are disclosed in Cizek, U.S. Pat. No. 3,383,435, incorporated herein by reference, and elsewhere.

As employed herein the term "plasticized" is used to describe compositions having a sufficient amount of plasticizer to reduce the temperature of optimum extrusion by at least about 25° F., and normally from about 25° to about 100° F.

It has now been surprisingly discovered that plasticized polyphenylene ether compositions comprising a mineral reinforcing agent, possess enhanced stiffness, as measured by flexural modulus and flexural strength, in comparison with corresponding compositions without said agent. Moreover, it is unexpected that the improvements in stiffness properties are obtained along with a significant retention of ductility, as measured by tensile elongation and impact resistance.

DESCRIPTION OF THE INVENTION

In its broadest aspects, the present invention comprises reinforced, plasticized thermoplastic compositions suitable for molding or shaping, i.e., by compression molding, extrusion, calendering, and the like, which possess enhanced stiffness in comparison with the corresponding unreinforced compositions, the compositions comprising:

(a) a polyphenylene ether resin alone or in combination with an impact modifier;
(b) a plasticizer therefor in an amount at least sufficient to reduce the temperature of optimum extrusion at least about 25° F.; and
(c) a mineral reinforcing agent in an amount at least sufficient to provide enhanced stiffness in comparison with a corresponding unreinforced composition.

In general, the polyphenylene ether resins of the compositions are of the family having structural units of the formula:

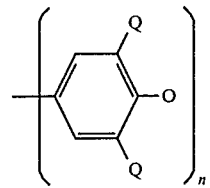

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Preferably, the polyphenylene ether resins are selected from those of the above formula wherein each Q is alkyl, most preferably having from 1 to 4 carbon atoms. Illustratively, members of this class include poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

Especially preferred is poly(2,6-dimethyl-1,4-phenylene)ether, preferably having an intrinsic viscosity of about 0.45 deciliters per gram (dl./g.) as measured in chloroform at 30° C.

The preparation of polyphenylene ether resins corresponding to the above formula is described in the above-mentioned patents of Hay and Stamatoff.

The choice of a plasticizer is not critical and any of the conventional materials used for this purpose can be employed. Preferably, component (b) will be selected from among phthalate and phosphate plasticizing materials, and especially phosphate plasticizers.

The phosphate plasticizer is preferably a compound of the formula:

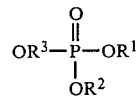

wherein $R^1$, $R^2$ and $R^3$ are the same or different and are alkyl, haloalkyl, cycloalkyl, halocycloalkyl, aryl, haloaryl, alkyl substituted aryl, haloalkyl substituted aryl, aryl substituted alkyl, haloaryl substituted alkyl, hydroxyalkyl, hydroxyaryl, hydroxyalkaryl, halogen and hydrogen.

Examples include cresyl diphenyl phosphate, 2-ethylhexyl diphenyl phosphate, tricresyl phosphate, triiosopropylphenyl phosphate, triphenyl phosphate, triethyl phosphate, dibutyl phenyl phosphate, diethyl phosphate, cresyl diphenyl phosphate, isooctyl diphenyl phosphate, tributyl phosphate, 2-ethylhexyl diphenyl phosphate, isodecyl diphenyl phosphate, isodecyl dicresyl phosphate, didecyl cresyl phosphate, tri-n-hexyl phosphate, di-n-octyl phenyl phosphate, di-2-ethylhexyl phenyl and tri-2-ethylhexyl phosphate or mixtures thereof. Especially preferred are aromatic phosphates, e.g., triphenyl phosphate.

Examples of phthalate plasticizers include dibenzyl phthalate, phenyl cresyl phthalate, diethyl phthalate, dimethyl phthalate, phenyl benzyl phthalate, butyl benzyl phthalate, butyl cyclohexyl phthalate, dibutyl phthalate, octyl cresyl phthalate, diphenyl phthalate, di-n-hexyl phthalate, disohexyl phthalate, butyl octyl phthalate, butyl decyl phthalate, diisooctyl phthalate, di-2-ethylhexyl phthalate, di-n-octyl phthalate, diisononyl phthalate, diisodecyl phthalate, di-2-propyl heptyl phthalate, di-n-nonyl phthalate, di-n-decyl phthalate and ditridecyl phthalate.

The plasticizer (b) is added in amounts which will be sufficient to provide a plasticized composition within the meaning of the term described above. In general, the plasticizer is present in amounts ranging from at least about 5 parts per hundred parts of resinous components combined, preferably from about 5 to about 100 parts per hundred parts of resin.

Illustratively, the mineral reinforcement is selected from among talcs, aluminum silicate, e.g., clay, hydrated, anhydrous or calcined clay, zinc oxide, titanium dioxide, antimony oxide, barium sulfate, precipitated or natural calcium carbonate, zinc sulfide, and the like. Especially preferred is hydrated aluminum silicate.

Amounts of the mineral reinforcing agent will vary depending on the formulation and needs of the particular composition. In preferred compositions, however, the mineral reinforcement will be present in at least about 5 parts per hundred parts of resins combined. Especially preferred embodiments will comprise anywhere from about 5 to about 150 parts of mineral reinforcement per hundred parts of resin plus plasticizer.

The nature of the impact modifiers for the polyphenylene ether or polyphenylene ether/polystyrene resin is not critical and any of the elastomeric polymers and copolymers which are conventionally employed to improve impact properties in thermoplastic compositions can be used. Illustratively, the impact modifiers can be selected from among elastomeric A-B-A$^1$ block copolymers wherein terminal blocks A and A$^1$ are the same or different and are derived from a vinyl aromatic compound, e.g., styrene, α-methyl styrene, vinyl toluene, vinyl xylene, vinyl naphthalene, and the like, and center block B is derived from a conjugated diene, e.g., butadiene, isoprene, 1,3-pentadiene, 2,3-dimethyl butadiene, and the like.

These can be made by an organometallic initiated polymerization process using, for example, sodium or lithium metal or an organic derivative thereof. The diene monomers can be polymerized with a monofunctional or difunctional initiator, as is described in Kennedy et al, Interscience Publishers, Vol. 23, Part II (1969), pages 553–559. Other methods of preparation are described in Zelinski, U.S. Pat. No. 3,251,905 and Holden et al, U.S. Pat. No. 3,231,635, the disclosures of which are incorporated herein by reference.

The relative ratios of the polymer units in the A-B-A$^1$ block copolymers can vary broadly. It is preferred that the center block B have a molecular weight greater than that of the combined terminal blocks, however, to obtain optimum impact strength and solvent resistance. In general, the molecular weight of each of the respective terminal blocks will range from about 2,000 to about 100,000 and the molecular weight of the center block will range from about 65,000 to about 1,000,000.

Examples include the Kraton resins, commercially available from Shell Chemical Co., Polymers Division, e.g., K-1101 (polystyrene-polybutadiene-polystyrene), K-1102 (polystyrene-polybutadiene-polystyrene), and K-1107 (polystyrene-polyisoprene-polystyrene).

The hydrogenated A-B-A$^1$ block copolymers are also well known. In general, these are block copolymers of the A-B-A$^1$ type in which terminal blocks A and A$^1$ are the same or different and, prior to hydrogenation, comprise homopolymers or copolymers derived from vinyl aromatic hydrocarbons and, especially, vinyl aromatics wherein the aromatic moiety can be either monocyclic or polycyclic. Examples of the monomers are styrene, α-methyl styrene, vinyl xylene, ethyl vinyl xylene, vinyl naphthalene, and the like. Center block B will always be derived from a conjugated diene, e.g., butadiene, isoprene, 1,3-pentadiene, and the like. Preferably, center block B will be comprised of polybutadiene or polyisoprene.

The preparation of hydrogenated A-B-A$^1$ block copolymers is described in Jones, U.S. Pat. No. 3,431,323, the disclosure of which is incorporated herein by reference.

Examples include the Kraton G resins, commercially available from Shell Chemical Co., Polymers Division, e.g., G-GXT-0650, G-GXT-0772, G-GXT-0782 and G-6521.

Radial teleblock copolymers of a vinyl aromatic compound, a conjugated diene and a coupling are also suitable impact modifiers for the compositions of this invention. These are branched polymers having segments, or blocks, comprised of a conjugated diene polymer, and a vinyl aromatic polymer, together with a coupling agent, wherein in the copolymer structure chains of the diene polymer radiate outwards from a coupling agent, each chain terminating at its other end with a block of the vinyl aromatic polymer.

The radial teleblock copolymers are known in the art. They are described in ADHESIVES AGE, December, 1971, pages 15–20 and RUBBER WORLD, January, 1973, pages 27–32, which were incorporated herein by reference. The preparation of these copolymers is described in Zelinski et al, U.S. Pat. No. 3,281,383, also incorporated herein by reference.

Examples of commercially available radial teleblock copolymers are the Solprene resins of Phillips Petroleum Company designated as Solprene 406 (containing about 60 parts by weight of butadiene units and about 40 parts by weight of styrene units), Solprene 411 (containing about 70 parts by weight of butadiene units and about 30 parts by weight of styrene units), Solprene 414 (containing about 60 parts by weight of butadiene units and about 40 parts by weight of styrene units), Solprene 417 (containing about 20 parts by weight of butadiene units and about 80 parts by weight of styrene units), and S411P (containing about 70 parts by weight of butadiene units and about 30 parts by weight of styrene units). These materials also include a relatively minor amount of coupling agent, e.g., less than 1 part by weight of coupling agent per 100 parts of polymer.

Also included are hydrogenated radial teleblock copolymers of a vinyl aromatic compound, a conjugated diene and a coupling agent, such as Solprene 512, commercially available from Phillips Petroleum Co.

The impact modifier can also be selected from acrylic resin modified diene rubber containing resins. Preferably, these will be of the group consisting of a resinous composition of a poly(alkylene methacrylate) grafted on to a butadiene-styrene copolymer backbone or an acrylonitrile-butadiene-styrene terpolymer backbone, or a resinous composition of a mixture of a poly(alkylmethacrylate) and a butadiene-styrene copolymer or an acrylonitrile-butadiene-styrene terpolymer.

A preferred commercially available impact modifier of this type is Acryloid KM611, sold by Rohm and Haas Co., which is an acrylic/styrene/styrene-butadiene terpolymer.

The aforementioned acrylic resin modified elastomers can be prepared by well known techniques, such as those described in U.S. Pat. No. 2,943,074 and U.S. Pat. No. 2,857,360, which are incorporated herein by reference.

The impact modifier can also be a graft copolymer of a vinyl aromatic compound and a diene, preferably comprising from about 75 to about 10% by weight of a vinyl aromatic monomer and from about 25 to about 90% by weight of a conjugated diene. By way of illustration, the aromatic monomer can be selected from among styrene, α-methyl styrene, vinyl toluene, vinyl xylene, and the like, and the diene can be selected from among butadiene, isoprene, and the like. Graft copolymers of styrene and styrene-butadiene are preferred.

An example of a preferred commercially available graft copolymer is Blendex 525, sold by Marbon Chemical Co.

The compositions of this invention can be prepared by conventional methods. Preferably, each of the ingredients is added as part of a blend premix, and the blend is passed through an extruder at an extrusion temperature of from about 500° to about 625° F., dependent on the needs of the particular composition. The strands emerging from the extruder may be cooled, chopped into pellets, and molded or otherwise worked to any desired shape.

DESCRIPTION OF THE PREFERRED EMBODIMENTS

The following examples are illustrative of the compositions of this invention. They are not to be construed as limiting the invention to the particular embodiments shown therein. All parts are by weight.

Units for the properties shown in the following Examples are as follows, unless otherwise indicated:
Tensile yield, psi
Tensile break, psi
Tensile elongation, %
Flexural modulus, psi
Flexural strength, psi
Melt viscosity, at 540° F., 1500 sec$^{-1}$, poise
Gloss, 45° surface gloss, dimensionless units
UL-94-Underwriters Laboratories Bulletin 94, sec/sec.
Izod Impact strength, ft.lbs./in.n.
Gardner Impact strength, in.lbs.
Heat distortion temperature, °F.
Coefficient of Linear Thermal Expansion (CLTE), in/in °F., measured from −30° C. to 65° C.

EXAMPLES 1-4

Self-extinguishing, plasticized blends of 78 parts of poly(2,6-dimethyl-1,4-phenylene ether) resin, intrinsic viscosity about 0.45 deciliters/gram as measured in chloroform at 30° C., 22 parts of triphenyl phosphate flame retardant plasticizer, 5 parts of styrene-butadiene-styrene block copolymer (Kraton 1101, Shell Chemical Co., Polymers Division), 1.5 parts of polyethylene and 20 parts of various mineral reinforcing agents, as shown, are compounded and extruded at a temperature of 580° F. The extrudate is chopped into pellets, molded into test bars at a temperature of about 520° F., and evaluated for mechanical and flame resistance properties. For purposes of comparison, a blend of the same ingredients in the same amounts is prepared, but without a filler. The mineral reinforcements and test results are shown in Table 1.

TABLE 1

| Example | Filler | Tensile Yield | Tensile Break | Tensile Elongation | Impact Izod | Impact Gardner | Flexural Modulus | Flexural Strength | Melt Viscosity | UL-94 Flame test |
|---|---|---|---|---|---|---|---|---|---|---|
| 1 | clay, untreated$^a$ | 9,600 | 10,100 | 64 | 10.3 | 242 | 428,000 | 14,100 | 3,500 | 1.3/2.0 |
| 2 | clay, treated$^b$ | 9,600 | 10,000 | 62 | 11.0 | 233 | — | — | — | — |
| 3 | clay, treated$^c$ | 9,700 | 9,800 | 54 | 3.9 | 233 | — | — | — | — |
| 4A* | NONE | 9,000 | 9,100 | 70 | 7.8 | 243 | 308,000 | 12,800 | 2,900 | 1.0/2.7 |

*control
$^a$Al—Sil—Ate NCF, Freeport Kaolin Co.
$^b$OX-1 coated clay, Freeport Kaolin Co.
$^c$OX-2 coated clay, Freeport Kaolin Co.

EXAMPLES 5-10

Self-extinguishing, plasticized compositions of 78 parts of poly(2,6-dimethyl-1,4-phenylene ether), 22 parts of triphenyl phosphate flame retardant plasticizer, 5 parts of styrene-butadiene-styrene block copolymer (Shell's Kraton 1101), 1.5 parts of polyethylene and a clay filler (Al-Sil Ate NCF, Freeport Kaolin Co.) in the amounts shown are prepared and molded as in Examples 1-4. The physical properties are summarized in Table 2.

TABLE 2

| Example | Phr (% by weight) | Tensile Yield | Tensile Break | Elong. | Impact Izod | Impact Gardner | Flexural Mod. | Flexural Str. | UL-94 | CLTE |
|---|---|---|---|---|---|---|---|---|---|---|
| 5 | 11.1 (10) | 9,200 | 9,300 | 65 | 10.1 | 253 | 401,000 | 14,000 | 1.3/5.7 | $4.0 \times 10^{-5}$ |
| 6 | 25 (20) | 9,900 | 9,800 | 64 | 7.0 | 222 | 492,000 | 15,600 | 1/3.3 | $3.4 \times 10^{-5}$ |
| 7 | 33 (25) | 10,200 | 9,900 | 50 | 2.5 | 202 | 562,000 | 16,100 | 2/6 | — |
| 8 | 43 (30) | 10,100 | 9,700 | 39 | 1.4 | 132 | 673,000 | 16,400 | 2.3/13 | $2.8 \times 10^{-5}$ |
| 9 | 67 (40) | 11,300 | 10,900 | 21 | 1.3 | 52 | 717,000 | 17,800 | 1.7/10.7 | — |
| 10 | 100 (50) | 12,700 | 12,700 | 8 | 0.7 | less than 10 | — | — | 3/45 | — |

TABLE 2-continued

| Example | Phr (% by weight) | Tensile | | | Impact | | Flexural | | UL-94 | CLTE |
|---|---|---|---|---|---|---|---|---|---|---|
| | | Yield | Break | Elong. | Izod | Gardner | Mod. | Str. | | |
| 10A* | NONE | 8,800 | 9,400 | 72 | 7.8 | 243 | 336,000 | 13,400 | 1.7/3 | 4.8 × 10$^{-5}$ |

*control
phr signifies part of clay per hundred parts of resin plus plasticizer
CLTE Coefficient of Linear Thermal Expansion It is shown that even with amounts of reinforcement as high as 67 phr (40%), in Example 9, a significant amount of ductility, as measured by tensile elongation and impact strength, is retained as compared with the unreinforced control (10A*).

EXAMPLES 11-13

Blends of poly(2,6-dimethyl-1,4-phenylene ether) resin, mineral oil, styrene-butadiene-styrene block copolymer (Kraton 1101), polyethylene and a clay reinforcing filler are compounded, extruded and molded as in Examples 1-4. The formulations and physical properties are summarized in Table 3.

TABLE 3

| EXAMPLE | 11 | 11A* | 12 | 13 | 13A* |
|---|---|---|---|---|---|
| Ingredients (parts by weight) | | | | | |
| poly(2,6-dimethyl-1,4-phenylene ether) | 78 | 78 | 78 | 85 | 85 |
| mineral oil (Kaydol) | 22 | 22 | 22 | 15 | 15 |
| styrene-butadiene-styrene block copolymer (Kraton 1101) | 5 | 5 | 5 | 5 | 5 |
| polyethylene | 1.5 | 1.5 | 1.5 | 1.5 | 1.5 |
| clay reinforcing agent (NCF, Freeport Kaolin) | 25 | — | 43 | 43 | — |
| Properties | | | | | |
| Tensile yield | 8,500 | 9,100 | 8,500 | 11,400 | 10,900 |
| Tensile strength at break | 8,400 | 8,000 | 8,400 | 11,400 | 9,700 |
| Tensile elongation | 39 | 52 | 24 | 71 | 60 |

TABLE 3-continued

| EXAMPLE | 11 | 11A* | 12 | 13 | 13A* |
|---|---|---|---|---|---|
| Izod impact | 3.5 | 7.4 | 2.4 | 2.0 | 5.8 |
| Gardner impact | 163 | 282 | 122 | 42 | 272 |
| Flexural modulus | 457,000 | 312,000 | 547,000 | 608,000 | 350,000 |
| Flexural strength | 13,600 | 12,500 | 14,300 | 18,000 | 14,700 |
| Heat Distortion Temp. | 232 | 230 | 241 | 267 | 253 |

*control

EXAMPLES 14-19

Blends of 78 parts of poly(2,6-dimethyl-1,4-phenylene ether) resin, 22 parts of triphenyl phosphate flame retardant plasticizer, 1.5 parts of polyethylene, 0.5 parts of tridecyl phosphite, 0.15 parts of zinc sulfide, 0.15 parts of zinc oxide, 43 parts of a clay reinforcing filler (NCF, Freeport Kaolin) and various impact modifiers and amounts, as shown, are compounded, extruded and molded as in Examples 1-4. The physical properties are summarized in Table 4.

TABLE 4

| Example | Impact Modifier | Tensile | | | Impact | | Flexural | |
|---|---|---|---|---|---|---|---|---|
| | | Yield | Break | Elong. | Izod | Gardner | Mod. | Str. |
| 14 | 5 parts styrene-butadiene-styrene block copolymer[e] | 10,500 | 9,600 | 49 | 1.8 | 203 | 583,000 | 16,000 |
| 15 | 10 parts styrene-butadiene-styrene block copolymer[e] | 9,800 | 9,200 | 51 | 2.7 | 212 | 538,000 | 14,700 |
| 16 | 5 parts styrene-butadiene-styrene block copolymer[e] | 10,600 | 10,200 | 50 | 2.0 | 185 | 580,000 | 14,500 |
| 17 | 5 parts hydrogenated styrene-butadiene-styrene block copolymer[f] | 9,000 | 8,800 | 33 | 2.4 | 190 | 515,000 | 13,600 |
| 18 | 5 parts acrylic-styrene-styrene-butadiene terpolymer[g] | 10,500 | 9,600 | 46 | 1.3 | 195 | 593,000 | 15,100 |
| 19 | 5 parts graft copolymer of styrene and styrene-butadien[h] | 10,400 | 9,600 | 49 | 1.3 | 195 | 615,000 | 15,300 |

[e]K1101, Shell Chem. Co., Polymers Div.
[f]KG 6521, Shell Chem. Co., Polymers Div.
[g]Acryloid KM 611, Rohm & Haas Co.
[h]Blendox 525, Marbon Chem. Co.

EXAMPLES 20-38

Blends of 78 parts of poly(2,6-dimethyl-1,4-phenylene ether), 22 parts of triphenyl phosphate, 5 parts of acrylic-styrene-butadiene terpolymer (Acryloid KM 611, Rohm & Haas Co.), 1.5 parts of polyethylene, 0.5 parts of tridecyl phosphite, 0.15 parts of zinc sulfide, 0.15 parts of zinc oxide and 43 parts of various mineral reinforcing agents are compounded, extruded and molded as in Examples 1-4. The mineral reinforcements and tests results are summarized in Tables 5, 5A and 5B.

TABLE 5

| Example | Filler | Tensile | | | Impact | | Flexural | | UL-94 |
|---|---|---|---|---|---|---|---|---|---|
| | | Yield | Break | Elong. | Izod | Gardner | Mod. | Str. | Flame Test |
| 20 | Calcium carbonate[i] | 9,400 | 7,800 | 16 | 0.9 | less than 10 | 451,000 | 14,200 | 1.2/20 |
| 21 | Calcium carbonate[j] | 9,500 | 7,600 | 21 | 1.0 | 10 | 461,000 | 14,800 | 1/2.3 |
| 22 | Antimony Oxide | 8,500 | 8,100 | 76 | 7.4 | 240 | 350,000 | 12,100 | 1.3/5.3 |
| 23 | Clay[k] | 10,100 | 9,100 | 29 | 1.6 | 150 | 516,000 | 14,900 | 1.7/4.7 |

TABLE 5-continued

| Example | Filler | Tensile | | | Impact | | Flexural | | UL-94 |
|---|---|---|---|---|---|---|---|---|---|
| | | Yield | Break | Elong. | Izod | Gardner | Mod. | Str. | Flame Test |
| 24 | Clay[l] | 10,100 | 8,600 | 25 | 1.0 | less than 10 | 578,000 | 15,000 | 1.7/2 |
| 25 | Clay[m] | 10,200 | 8,900 | 34 | 1.1 | 140 | 560,000 | 15,200 | 1/3 |
| 26 | Clay[n] | 11,000 | 9,300 | 36 | 1.4 | 260 | 642,000 | 16,000 | 1.3/2 |
| 26A* | NONE | 9,300 | 8,800 | 90 | 20.4 | 300 | 317,000 | 12,800 | 1.7/3 |

*control
[i]Carbium, Diamond Shamrock Co., precipitated calcium carbonate
[j]Carbium MM, Diamond Shamrock Co., precipitated calcium carbonate
[k]Al—Sil—Ate W, Freeport Kaolin Co.
[l]Al—Sil—Ate LO, Freeport Kaolin Co.
[m]Al—Sil—Ate HO2, Freeport Kaolin Co.
[n]Al—Sil—Ate NC, Freeport Kaolin Co.

TABLE 5A

| Example | Filler | Tensile | | | Impact | |
|---|---|---|---|---|---|---|
| | | Yield | Break | Elong. | Izod | Gardner |
| 27 | Barium sulfate[m] | 9,300 | 8,000 | 61 | 1.5 | 83 |
| 28 | Calcium carbonate[n] | 8,800 | 7,100 | 23 | 1.2 | 10 |
| 29 | Calcium carbonate[o] | 8,900 | 7,200 | 25 | 1.3 | 75 |
| 30 | Calcium carbonate[p] | 9,000 | 7,100 | 25 | 1.2 | 31 |
| 31 | Calcium carbonate[q] | 9,100 | 7,200 | 28 | 1.3 | 52 |
| 31A* | NONE | 9,200 | 9,200 | 86 | 3.3 | 202 |

*control
[m]#1 Barytes, Charles Pfizer Co.
[n]Marblewhite 325, Charles Pfizer Co., a pulverized natural calcium carbonate
[o]Vicron 15-15, Charles Pfizer Co., a ground natural calcium carbonate
[p]Vicron 25-11, Charles Pfizer Co., ground natural calcium carbonate
[q]Vicron 41-8, Charles Pfizer Co., ground natural calcium carbonate

TABLE 5B

| Example | Filler | Tensile | | | Impact | | Flexural | |
|---|---|---|---|---|---|---|---|---|
| | | Yield | Break | Elong. | Izod | Gardner | Mod. | Str. |
| 32 | Clay[r] | 9,500 | 7,600 | 45 | 1.2 | 52 | 565,000 | 14,100 |
| 33 | Calcium carbonate[s] | 8,000 | 6,700 | 50 | 1.0 | less than 10 | 382,000 | 12,000 |
| 34 | Talc[t] | 9,800 | 7,500 | 24 | 1.1 | 10 | 654,000 | 14,600 |
| 35 | Talc[u] | 9,200 | 9,200 | 17 | 1.0 | 10 | 593,000 | 13,800 |
| 36 | Talc[v] | 9,700 | 9,700 | 22 | 1.1 | 40 | 650,000 | 14,600 |
| 37 | Talc[w] | 10,200 | 8,600 | 22 | 1.2 | 60 | 674,000 | 14,700 |
| 37A* | NONE | 7,800 | 7,700 | 102 | 2.6 | 293 | 283,000 | 10,950 |

*control
[r]Al—Sil—Ate NC, Freeport Kaolin Co.
[s]Winnofil 5, ICI Co.
[t]Emtal 596, Englehard Co.
[u]MP 45-26, Charles Pfizer Co.
[v]MP 25-38, Charles Pfizer Co.
[w]MP 12-50, Charles Pfizer Co.

EXAMPLES 38–43

Molded compositions of poly(2,6-dimethyl-1,4-phenylene ether) resin, triphenyl phosphate and various mineral reinforcing agents, as shown, are prepared as in Examples 1-4 and evaluated for physical properties. The formulations and physical properties are summarized in Tables 6 and 6A, respectively.

TABLE 6

| Ingredients (parts by weight) | EXAMPLE | | | | | |
|---|---|---|---|---|---|---|
| | 38 | 39 | 40 | 41 | 42 | 43 |
| poly(2,6-dimethyl-1,4-phenylene ether) | 55 | 55 | 55 | 63 | 63 | 63 |
| triphenyl phosphate | 15 | 15 | 15 | 17 | 17 | 17 |
| clay | 30 | — | — | 20 | — | — |
| titanim dioxide | — | 30 | — | — | 20 | — |
| zinc oxide | — | — | 30 | — | — | 20 |

TABLE 6A

| Example | Tensile | | | Impact | | Flexural | | Gloss | Melt Viscosity |
|---|---|---|---|---|---|---|---|---|---|
| | Yield | Break | Elong. | Izod | Gardner | Mod. | Str. | | |
| 38 | 10,900 | 8,700 | 33 | 0.9 | 10 | 582,000 | 16,900 | 40.5 | 1,950 |
| 39 | 10,200 | 8,700 | 63 | 0.9 | 110 | 438,000 | 16,000 | — | 2,150 |
| 40 | 10,300 | 8,600 | 71 | 0.8 | 100 | 410,000 | 15,900 | 65 | 1,980 |
| 41 | 10,800 | 9,100 | 75 | 1.0 | 123 | 485,000 | 16,300 | 52.5 | 2,050 |
| 42 | 10,000 | 8,600 | 73 | 0.9 | 100 | 397,000 | 15,700 | — | 2,250 |
| 43 | 10,200 | 8,500 | 68 | 1.0 | 110 | 390,000 | 15,800 | 64,7 | 2,300 |

EXAMPLES 44–48

Molded compositions of poly(2,6-dimethyl-1,4-phenylene ether), triphenyl phosphate, mineral reinforcing agents and impact modifiers are prepared as in Examples 1-4. The formulations and physical properties are shown in Tables 7 and 7A, respectively.

TABLE 7

| Ingredients (parts by weight) | EXAMPLE | | | | |
|---|---|---|---|---|---|
| | 44 | 45 | 46 | 47 | 48 |
| poly(2,6-dimethyl-1,4-phenylene ether) | 55 | 55 | 55 | 47 | 39 |
| triphenyl phosphate | 15 | 15 | 15 | 13 | 11 |
| clay | 30 | — | — | — | — |
| titanium dioxide | — | 30 | 30 | 40 | 50 |
| styrene/styrene-butadiene copolymer (Blen- | 5 | 5 | — | 5 | 5 |

TABLE 7-continued

| Ingredients (parts by weight) | EXAMPLE | | | | |
|---|---|---|---|---|---|
| | 44 | 45 | 46 | 47 | 48 |
| dex 525, Marbon Chem. Co.) | | | | | |
| acrylic resin modified styrene-butadiene co-polymer (Acryloid KM 611, Rohm & Haas Co.) | — | — | 5 | — | — |

TABLE 7A

| Example | Tensile | | | Impact | | Flexural | | Gloss | Heat Deflection Temp. | UL-94 Flame Test |
|---|---|---|---|---|---|---|---|---|---|---|
| | Yield | Break | Elong. | Izod | Gardner | Mod. | Str. | | | |
| 44 | 9,600 | 8,200 | 45 | 1.7 | 183 | 546,000 | 14,300 | 41.0 | 209 | V-O |
| 45 | 8,900 | 8,900 | 80 | 7.0 | 232 | 363,000 | 12,700 | 60.5 | 206 | V-O |
| 46 | 8,900 | 9,100 | 83 | 7.5 | 242 | 351,000 | 12,800 | 60.5 | — | V-O |
| 47 | 8,700 | 8,300 | 55 | 4.8 | 222 | 396,000 | 13,250 | 57.5 | 206 | V-O |
| 48 | 8,700 | 8,200 | 42 | 3.9 | 183 | 468,000 | 13,500 | 50.5 | 202 | V-O |

EXAMPLES 49–50

Blends of poly(2,6-dimethyl-1,4-phenylene ether) resin, triphenyl phosphate, clay (NCF, Freeport Kaolin), a styrene-butadiene-styrene block copolymer (Kraton 1101), polyethylene, tridecyl phosphite, zinc sulfide and zinc oxide are compounded, extruded and molded as in Examples 1–4. The molded compositions are evaluated for physical properties, initially, after heat aging and after water immersion. The formulations and test results are summarized in Tables 8, 8A, 8B and 8C.

TABLE 8

| Ingredients (parts by weight) | EXAMPLE | |
|---|---|---|
| | 49 | 50 |
| poly(2,6-dimethyl-1,4-phenylene ether) | 55 | 67 |
| triphenyl phosphate | 15 | 13 |
| styrene-butadiene-styrene block copolymer (Kraton 1101) | 5 | 5 |
| clay | 30 | 20 |
| polyethylene | 1.5 | 1.5 |
| tridecyl phosphite | 0.5 | 0.5 |
| zinc sulfide | 0.15 | 0.15 |
| zinc oxide | 0.15 | 0.15 |

TABLE 8A

Initial Physical Properties

| Properties | EXAMPLE | |
|---|---|---|
| | 49 | 50 |
| Tensile yield, psi | | |
| 73° F. | 9,360 | 9,120 |
| 150° F. | 6,770 | 6,370 |
| Elongation, % | | |
| 73° F. | 41 | 68 |
| 150° F. | 39 | 58 |
| Flexural Strength, psi | | |
| 73° F. | 13,900 | 12,700 |
| 150° F. | 8,400 | 8,200 |
| Flexural Modulus, psi | | |
| 73° F. | 558,900 | 419,600 |
| 150° F. | 446,000 | 353,000 |
| Notched Izod impact, ft. lbs./in. | | |
| 73° F. | 3.3 | 8.6 |
| −40° F. | 0.8 | 1.1 |
| Gardner impact, in. lbs. | | |
| 73° F. | 83 | 252 |
| −40° F. | 10 | 45 |

TABLE 8B

Physical Properties After Heat Aging at 65° C. and 115° C.

| at 65° C. Tensile | | | | | at 115° C. Tensile | | | | |
|---|---|---|---|---|---|---|---|---|---|
| No. of Days | Yield | Break | Elong. | Impact | No. of Days | Yield | Break | Elong. | Impact |
| Example 49 | | | | | | | | | |
| 0 | 9,400 | 8,400 | 41 | 45.3 | 0 | 9,400 | 8,400 | 41 | 45.3 |
| 1 | 9,500 | 8,100 | 34 | 41.5 | 1 | 9,900 | 7,800 | 31 | 34.3 |
| 10 | 10,000 | 8,300 | 32 | 42.5 | 10 | — | — | — | 30.0 |
| 30 | 10,100 | 8,700 | 37 | 46.9 | 20 | 10,800 | 9,700 | 18 | 27.6 |
| 59 | 10,700 | 9,000 | 29 | 39.3 | 30 | 11,800 | 11,800 | 16 | 24.2 |
| 90 | 11,000 | 9,100 | 32 | 44.3 | 59 | 12,000 | 12,000 | 8 | 23.3 |
| 180 | 11,700 | 9,600 | 25 | 32.0 | 90 | 11,900 | 11,900 | 8 | 23.4 |
| Example 50 | | | | | | | | | |
| 0 | 9,100 | 8,700 | 68 | 63.7 | 0 | 9,100 | 8,700 | 68 | 63.7 |
| 1 | 9,600 | 8,600 | 60 | 61.0 | 1 | 10,000 | 8,100 | 41 | 48.3 |
| 10 | 9,800 | 8,400 | 52 | 60.7 | 10 | — | — | — | 39.2 |
| 30 | 9,700 | 8,000 | 54 | 62.1 | 20 | 11,200 | 8,500 | 22 | 35.8 |
| 59 | 9,900 | 8,300 | 34 | 59.4 | 30 | 11,600 | 10,200 | 29 | 28.2 |
| 90 | 10,600 | 9,100 | 50 | 57.0 | 59 | 12,300 | 9,900 | 19 | 21.8 |
| 180 | 11,100 | 9,500 | 45 | 58.8 | 90 | 12,900 | 12,900 | 13 | 25.7 |

TABLE 8C

Physical Properties After Immersing in Water at 200° F.

| | Tensile | | | Izod |
|---|---|---|---|---|
| No. of Days | Yield | Break | Elong. | Impact |
| Example 49 | | | | |
| 0 | 9,400 | 8,400 | 41 | 3.3 |
| 10 | 9,100 | 7,900 | 40 | 3.1 |
| 20 | 9,100 | 7,700 | 31 | 3.0 |
| 30 | 9,300 | 7,800 | 31 | 3.5 |
| 40 | 9,600 | 8,300 | 27 | 3.6 |
| 50 | 9,500 | 8,300 | 24 | 3.5 |
| 59 | 9,900 | 8,400 | 23 | 3.5 |
| 90 | 10,000 | 7,900 | 27 | 3.2 |
| Example 50 | | | | |

TABLE 8C-continued

| Physical Properties After Immersing in Water at 200° F. | | | | |
|---|---|---|---|---|
| | Tensile | | | |
| No. of Days | Yield | Break | Elong. | Izod Impact |
| 0 | 9,100 | 8,700 | 68 | 8.6 |
| 10 | 9,100 | 8,500 | 88 | 3.9 |
| 20 | 9,500 | 8,000 | 40 | 3.8 |
| 30 | 9,600 | 8,100 | 59 | 4.1 |
| 40 | 9,800 | 8,200 | 56 | 4.3 |
| 50 | 10,100 | 8,300 | 40 | 3.8 |
| 59 | 10,200 | 8,300 | 28 | 3.7 |
| 90 | 10,700 | 8,700 | 23 | 3.3 |

Obviously, other modifications and variations of the present invention are possible in the light of the above teachings. It is therefore, to be understood that changes may be made in the particular embodiments described above which are within the full intended scope of the invention as defined in the appended claims.

I claim:

1. A reinforced, plasticized thermoplastic composition comprising:
   (a) a polyphenylene ether resin;
   (b) a plasticizer therefor in an amount at least sufficient to reduce the temperature of optimum extrusion at least about 25° F., said amount being at least about 15 parts per hundred parts by weight of said resin; and
   (c) a mineral reinforcing agent selected from the group consisting of aluminum silicate (clay), talc, zinc oxide, titanium dioxide, barium sulfate, calcium carbonate, and antimony oxide, said agent being present in an amount at least sufficient to provide enhanced stiffness in comparision with a corresponding composition not containing said mineral reinforcing agent, said amount be at least about 20 parts per hundred parts by weight of resin.

2. A composition as defined in claim 1 wherein the mineral reinforcing agent is present in an amount of from about 15 to about 150 parts per hundred parts of resin plus plasticizer.

3. A composition as defined in claim 1 wherein the mineral reinforcing agent is an aluminum silicate.

4. A composition as defined in claim 3 wherein said mineral reinforcing agent is a hydrated aluminum silicate.

5. A composition as defined in claim 1 wherein the polyphenylene ether resin (a) comprises repeating structural units of the formula:

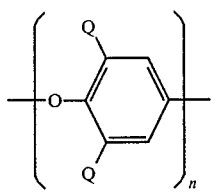

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

6. A composition as defined in claim 5 wherein in said polyphenylene ether resin each Q is alkyl having from 1 to 4 carbon atoms.

7. A composition as defined in claim 5 wherein said polyphenylene ether resin is poly(2,6-dimethyl-1,4-phenylene) ether.

8. A composition as defined in claim 1 which includes an impact modifier.

9. A composition as defined in claim 8 wherein the impact modifier is an elastomeric A-B-A$^1$ block copolymer.

10. A composition as defined in claim 9 wherein the impact modifier is a block copolymer of styrene and butadiene.

11. A composition as defined in claim 9 wherein the impact modifier is a block copolymer of styrene and isoprene.

12. A composition as defined in claim 8 wherein the impact modifier is an hydrogenated A-B-A$^1$ block copolymer.

13. A composition as defined in claim 12 wherein the impact modifier is an hydrogenated block copolymer of styrene and butadiene.

14. A composition as defined in claim 13 wherein the impact modifier is an hydrogenated block copolymer of styrene and isoprene.

15. A composition as defined in claim 8 wherein the impact modifier is a radical teleblock copolymer of a vinyl aromatic compound, a conjugated diene and a coupling agent.

16. A composition as defined in claim 8 wherein the impact modifier is an acrylic resin modified diene rubber containing resin.

17. A composition as defined in claim 16 wherein said acrylic resin modified diene rubber-containing resin is selected from the group consisting of a resinous composition consisting essentially of a poly(alkyl methacrylate) grafted onto a butadiene-styrene backbone or an acrylonitrile-butadiene-styrene backbone or a resinous composition consisting essentially of a mixture of a poly(alkyl methacrylate) and a butadiene styrene copolymer or an acrylonitrile-butadiene-styrene terpolymer.

18. A composition as defined in claim 8 wherein the impact modifier is a graft copolymer of a vinyl aromatic compound and a diene compound.

19. A composition as defined in claim 18 wherein the impact modifier is a graft copolymer of styrene and styrenebutadiene.

20. A composition as defined in claim 1 wherein the plasticizer (b) is a compound of the formula:

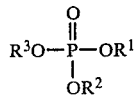

wherein $R^1$, $R^2$ and $R^3$ are the same or different and are alkyl, haloalkyl, cycloalkyl, halocycloalkyl, aryl, haloaryl, alkyl substituted aryl, haloalkyl substituted aryl, aryl substituted alkyl, haloaryl substituted alkyl, hydroxyalkyl, hydroxyaryl, hydroxyalkaryl, halogen and hydrogen.

21. A composition as defined in claim 20 wherein said plasticizer (b) is an aromatic phosphate plasticizer.

22. A composition as defined in claim 21 wherein said aromatic phosphate is triphenyl phosphate.

23. A composition as defined in claim 1 which includes a flame retardant amount of a flame retardant agent.

24. A composition as defined in claim 1 in which the plasticizer (b) is a flame retardant agent and is present in a flame retardant amount.

25. A composition as defined in claim 1 in which the mineral reinforcing agent is anhydrous aluminum silicate.

26. A composition as defined in claim 1 wherein the mineral reinforcing agent is talc.

27. A composition as defined in claim 1 wherein the mineral reinforcing agent is zinc oxide.

28. A composition as defined in claim 1 wherein the mineral reinforcing agent is titanium dioxide.

29. A composition as defined in claim 1 wherein the mineral reinforcing agent is antimony oxide.

30. A composition as defined in claim 1 wherein the mineral reinforcing agent is barium sulfate.

31. A composition as defined in claim 1 wherein the mineral reinforcing agent is calcium carbonate.

32. A reinforced, plasticized thermoplastic composition having enhanced stiffness, comprising
    (a) a polyphenylene ether resin;
    (b) a plasticizer selected from the group consisting of mineral oils and aromatic phosphates, present in an amount sufficient to reduce the temperature of optimum extrusion at least about 25° F., said amount being at least about 15 parts per hundred parts by weight of said resin; and
    (c) a mineral reinforcing agent selected from the group consisting of aluminum silicate (clay), talc, zinc oxide, titanium dioxide, antimony oxide, barium sulfate, and calcium carbonate, said mineral reinforcing agent being in an amount of at least about 20 parts per hundred parts by weight of resin.

33. A composition according to claim 32, which includes an impact modifier.

* * * * *

UNITED STATES PATENT AND TRADEMARK OFFICE
CERTIFICATE OF CORRECTION

PATENT NO. : 4,525,508
DATED : June 25, 1985
INVENTOR(S) : Gim F. Lee, Jr.

It is certified that error appears in the above—identified patent and that said Letters Patent is hereby corrected as shown below:

In column 13, on line 36, the word "be" should read --being--.

In column 14, on line 21, the word "an" should read --a--; on line 24, the word "an" should read --a--; on line 26, the number "13" should be --12--; on line 27, the word "an" should read --a--; on line 30, the word "radical" should read --radial--; on line 43, there should be a hyphen (-) between the words "butadiene" and "styrene"; and on line 51, there should be a hyphen (-) between "styrene" and "butadiene".

Signed and Sealed this

Tenth Day of June 1986

[SEAL]

Attest:

DONALD J. QUIGG

Attesting Officer   Commissioner of Patents and Trademarks